(12) United States Patent
Hanson et al.

(10) Patent No.: US 11,345,781 B2
(45) Date of Patent: May 31, 2022

(54) METHODS FOR ADDITIVE MANUFACTURING OF RADIATION SHIELDING PARTS

(71) Applicant: Stratasys, Inc., Eden Prairie, MN (US)

(72) Inventors: Andrew Hanson, Saint Paul, MN (US); Neil R. Granlund, Columbia Heights, MN (US)

(73) Assignee: Stratasys, Inc., Eden Prairie, MN (US)

( * ) Notice: Subject to any disclaimer, the term of this patent is extended or adjusted under 35 U.S.C. 154(b) by 29 days.

(21) Appl. No.: 16/520,025

(22) Filed: Jul. 23, 2019

(65) Prior Publication Data

US 2020/0024394 A1 Jan. 23, 2020

Related U.S. Application Data

(60) Provisional application No. 62/702,089, filed on Jul. 23, 2018.

(51) Int. Cl.
| | |
|---|---|
| *B29C 64/118* | (2017.01) |
| *B29C 64/209* | (2017.01) |
| *B29K 71/00* | (2006.01) |
| *B33Y 10/00* | (2015.01) |
| *B33Y 70/00* | (2020.01) |

(Continued)

(52) U.S. Cl.
CPC .......... *C08G 65/48* (2013.01); *B29C 64/118* (2017.08); *B29C 64/209* (2017.08); *C08G 65/40* (2013.01); *C08G 65/4012* (2013.01); *C08K 3/08* (2013.01); *C08K 3/11* (2018.01); *C08L 71/02* (2013.01); *B29K 2071/00* (2013.01); *B33Y 10/00* (2014.12); *B33Y 30/00* (2014.12); *B33Y 70/00* (2014.12); *B33Y 80/00* (2014.12); *C08K 3/38* (2013.01); *C08K 2003/0887* (2013.01); *C08K 2003/385* (2013.01); *C08K 2201/005* (2013.01); *C08L 27/18* (2013.01)

(58) Field of Classification Search
CPC .......................... B29C 64/118; B29K 2071/00
See application file for complete search history.

(56) References Cited

U.S. PATENT DOCUMENTS

| | | | |
|---|---|---|---|
| 5,503,785 | A | 4/1996 | Crump et al. |
| 6,004,124 | A | 12/1999 | Swanson et al. |

(Continued)

FOREIGN PATENT DOCUMENTS

WO WO-2019162654 A1 * 8/2019 ............. B33Y 40/20

OTHER PUBLICATIONS

Kim et al, Nano-W Dispersed Gamma Radiation Shielding Materials, 2014, Wiley-VCH Verlag GmbH, vol. 16 Issue: 9, 1083-89 (Year: 2014).*

*Primary Examiner* — Niki Bakhtiari
*Assistant Examiner* — Nicholas J Chidiac
(74) *Attorney, Agent, or Firm* — Peter J. Ims; Westman, Champlin & Koehler, P.A.

(57) ABSTRACT

A melt-processable consumable material configured as a feedstock for use in an additive manufacturing system includes a polymeric matrix comprising one or more polyaryletherketones, wherein the polymeric matrix comprises between about 10 wt % and about 50 wt % of the total weight of the feedstock. The material includes radiation shielding particles dispersed within the polymer matrix wherein the radiation shielding particles comprise between about 50 wt % and less than 90 wt % of the total weight of the feedstock.

19 Claims, 10 Drawing Sheets

(51) Int. Cl.
*C08K 3/08* (2006.01)
*C08K 3/11* (2018.01)
*C08L 27/18* (2006.01)
*C08L 71/02* (2006.01)
*C08G 65/48* (2006.01)
*C08G 65/40* (2006.01)
*B33Y 30/00* (2015.01)
*B33Y 80/00* (2015.01)
*C08K 3/38* (2006.01)

(56) References Cited

U.S. PATENT DOCUMENTS

| | | | |
|---|---|---|---|
| 6,054,077 A | 4/2000 | Comb et al. | |
| 6,547,995 B1 | 4/2003 | Comb | |
| 6,814,907 B1 | 11/2004 | Comb | |
| 7,384,255 B2 | 6/2008 | Labossiere et al. | |
| 7,604,470 B2 | 10/2009 | Labossiere et al. | |
| 7,625,200 B2 | 12/2009 | Leavitt | |
| 7,896,209 B2 | 3/2011 | Batchelder et al. | |
| 8,153,182 B2 | 4/2012 | Comb et al. | |
| 8,419,996 B2 | 4/2013 | Swanson et al. | |
| 8,647,102 B2 | 2/2014 | Swanson et al. | |
| 8,728,349 B2* | 5/2014 | Liu | G21F 1/02 252/478 |
| 9,364,986 B1 | 7/2016 | Patterson | |
| 10,074,449 B2* | 9/2018 | White | G21F 1/042 |
| 10,589,447 B2* | 3/2020 | Capobianco | B29C 64/314 |
| 10,851,251 B2* | 12/2020 | Fedynyshyn | B29C 64/118 |
| 10,919,227 B2* | 2/2021 | Cook | B33Y 40/20 |
| 2012/0012793 A1* | 1/2012 | Liu | C08K 5/098 252/478 |
| 2015/0048209 A1* | 2/2015 | Hoyt | G21F 1/12 264/308 |
| 2015/0257313 A1 | 9/2015 | Yanke et al. | |
| 2016/0346997 A1* | 12/2016 | Lewis | B33Y 80/00 |
| 2017/0028589 A1* | 2/2017 | Capobianco | B01F 5/0685 |
| 2017/0239723 A1* | 8/2017 | Hoyt | B33Y 80/00 |
| 2017/0365365 A1* | 12/2017 | White | E04G 21/0463 |
| 2018/0320008 A1* | 11/2018 | Fedynyshyn | B33Y 70/00 |
| 2019/0337220 A1* | 11/2019 | Beyerle | B33Y 10/00 |
| 2020/0353682 A1* | 11/2020 | Fedynyshyn | H01F 1/44 |
| 2020/0354542 A1* | 11/2020 | O'Sullivan | B33Y 70/00 |
| 2020/0406551 A1* | 12/2020 | Cook | B29C 64/118 |

\* cited by examiner

METHODS FOR ADDITIVE MANUFACTURING OF RADIATION SHIELDING PARTS

CROSS REFERENCE TO RELATED APPLICATION

This application claims the benefit of U.S. Provisional Patent Application Ser. No. 62/702,089 entitled FEEDSTOCK AND METHODS FOR ADDITIVE MANUFACTURING OF RADIATION SHIELDING PARTS that was filed on Jul. 23, 2018, the contents of which are incorporated by reference in its entirety.

BACKGROUND

The present disclosure relates to additive manufacturing materials and techniques for printing three-dimensional (3D) parts. In particular, the present disclosure relates to a 3D printing feedstock filled with radiation shielding particles and methods of using the feedstock in additive manufacturing of radiation-shielded parts. All references disclosed herein are incorporated by reference.

Additive manufacturing, also called 3D printing, is generally a process in which a three-dimensional (3D) object is built by adding material to form a 3D part rather than subtracting material as in traditional machining. Using one or more additive manufacturing techniques, a three-dimensional solid object of virtually any shape can be printed from a digital model of the object by an additive manufacturing system, commonly referred to as a 3D printer. A typical additive manufacturing work flow includes slicing a three-dimensional computer model into thin cross sections defining a series of layers, translating the result into two-dimensional position data, and transmitting the data to a 3D printer which manufactures a three-dimensional structure in an additive build style. Additive manufacturing entails many different approaches to the method of fabrication, including material extrusion, ink jetting, selective laser sintering, powder/binder jetting, electron-beam melting, electrophotographic imaging, and stereolithographic processes.

In a typical extrusion-based additive manufacturing system (e.g., fused deposition modeling systems developed by Stratasys, Inc., Eden Prairie, Minn.), a 3D object may be printed from a digital representation of the printed part by extruding a viscous, flowable thermoplastic or filled thermoplastic material from a print head along toolpaths at a controlled extrusion rate. The extruded flow of material is deposited as a sequence of roads onto a substrate, where it fuses to previously deposited material and solidifies upon a drop in temperature. The print head includes a liquefier which receives a supply of the thermoplastic material in the form of a flexible filament, and a nozzle tip for dispensing molten material. The filament may be configured having a profile that is round, rectangular, tubular or other geometries suited for feeding to a fused deposition modeling print head. A filament drive mechanism engages the filament such as with a drive wheel and a bearing surface, or pair of toothed-wheels, and feeds the filament into the liquefier where the filament is melted. The unmelted portion of the filament essentially fills the diameter of the liquefier tube, providing a plug-flow type pumping action to extrude the molten filament material further downstream in the liquefier, from the tip to print a part, to form a continuous flow or toolpath of resin material. The extrusion rate is unthrottled and is based only on the feed rate of filament into the liquefier, and the filament is advanced at a feed rate calculated to achieve a targeted extrusion rate, such as is disclosed in Comb U.S. Pat. No. 6,547,995.

In a system where the material is deposited in planar layers, the position of the print head relative to the substrate is incremented along an axis (perpendicular to the build plane) after each layer is formed, and the process is then repeated to form a printed part resembling the digital representation. In fabricating printed parts by depositing layers of a part material, supporting layers or structures are typically built underneath overhanging portions or in cavities of printed parts under construction, which are not supported by the part material itself. A support structure may be built utilizing the same deposition techniques by which the part material is deposited. A host computer generates additional geometry acting as a support structure for the overhanging or free-space segments of the printed part being formed. Support material is then deposited pursuant to the generated geometry during the printing process. The support material adheres to the part material during fabrication, and is removable from the completed printed part when the printing process is complete.

A multi-axis additive manufacturing system may be utilized to print 3D parts using fused deposition modeling techniques. The multi-axis system may include a robotic arm movable in six degrees of freedom. The multi-axis system may also include a build platform movable in two or more degrees of freedom and independent of the movement of the robotic arm to position the 3D part being built to counteract effects of gravity based upon part geometry. An extruder may be mounted at an end of the robotic arm and may be configured to extrude material with a plurality of flow rates, wherein movement of the robotic arm and the build platform are synchronized with the flow rate of the extruded material to build the 3D part. The multiple axes of motion can utilize complex tool paths for printing 3D parts, including single continuous 3D tool paths for up to an entire part, or multiple 3D tool paths configured to build a single part. Use of 3D tool paths can reduce issues with traditional planar toolpath 3D printing, such as stair-stepping (layer aliasing), seams, the requirement for supports, and the like. Without a requirement to slice a part to be built into multiple layers each printed in the same build plane, the geometry of the part may be used to determine the orientation of printing, as well as the routing for all toolpaths.

The medical, energy and aerospace industries utilize radiation shielding devices in a variety of geometries. For decades, lead was used as the standard for radiation shielding. Some thermoplastic materials have been used, with the addition of high-density metallic fillers, to produce radiation shielding using an injection molding process. There remains a need to fabricate light-weight, more complex part geometries not producible with injection molding, that also provide robust final parts with radiation shielding properties, and are operable in a fused deposition modeling process.

SUMMARY

An aspect of the present disclosure is directed to a melt-processable consumable material. The material is configured to be used as a feedstock for use in an additive manufacturing system, where the material includes a polymeric matrix comprising one or more polyaryletherketones, wherein the polymeric matrix comprises between about 10 wt % and about 50 wt % of the total weight of the feedstock. The material includes radiation shielding particles dispersed within the polymer matrix wherein the radiation shielding particles comprise between about 50 wt % and less than 90 wt % of the total weight of the feedstock.

Another aspect of the present disclosure is directed to a method of printing a radiation shielding part with an additive manufacturing system. The method includes providing a melt-processable material configured as a filament feedstock. The material comprises a polymeric matrix comprising one or more polyaryletherketones, wherein the polymeric matrix comprises between about 10 wt % and about 50 wt % of the total weight of the feedstock, and radiation shielding particles dispersed within the polymer matrix wherein the radiation shielding particles comprise between about 50 wt % and less than 90 wt % of the total weight of the feedstock, wherein the radiation shielding particles have a maximum size of 25 μm. The method includes heating the feedstock to a melted state in a print head, and depositing the melted feedstock from a nozzle of the print head along toolpaths in a build pattern based upon a digital model of the part to print the radiation shielding part, wherein the nozzle has an inner diameter ranging from about 125 microns to about 510 microns. The radiation shielding part resists off gassing in a vacuum and provides radiation absorption or a dielectric effect.

Another aspect of the present disclosure relates to a method of printing a part with radiation shielding capabilities with an extrusion based additive manufacturing system. The method includes assuming an amount of radiation to which the part is to be subjected; determining the sensitivity of electronic equipment to radiation and determining radiation shielding capabilities of a melt-processable material configured as a filament feedstock. The filament feed stock comprises a polymeric matrix comprising one or more polyaryletherketones, wherein the polymeric matrix comprises between about 10 wt % and about 50 wt % of the total weight of the feedstock, and radiation shielding particles dispersed within the polymer matrix wherein the radiation shielding particles comprise between about 50 wt % and less than 90 wt % of the total weight of the feedstock, wherein the radiation shielding particles have a maximum size of 25 μm. The method includes determining a thickness of the part to provide a necessary amount of radiation shielding for the electronic equipment based upon the formula $$t = \frac{\ln(I_0/I)}{\mu}$$

The method includes creating a digital model of the part having the determined thickness and slicing the model. The method includes heating the feedstock to a melted state in a print head; and
depositing the melted feedstock from a nozzle of the print head along toolpaths in a build pattern based upon the sliced digital model of the part to print the radiation shielding part, wherein the nozzle has an inner diameter ranging from about 125 microns to about 510 microns to print the part in a layer-wise manner to the predetermined thickness to provide the determined radiation absorption or a dielectric effect.

DETAILED DESCRIPTION

Figure 1:
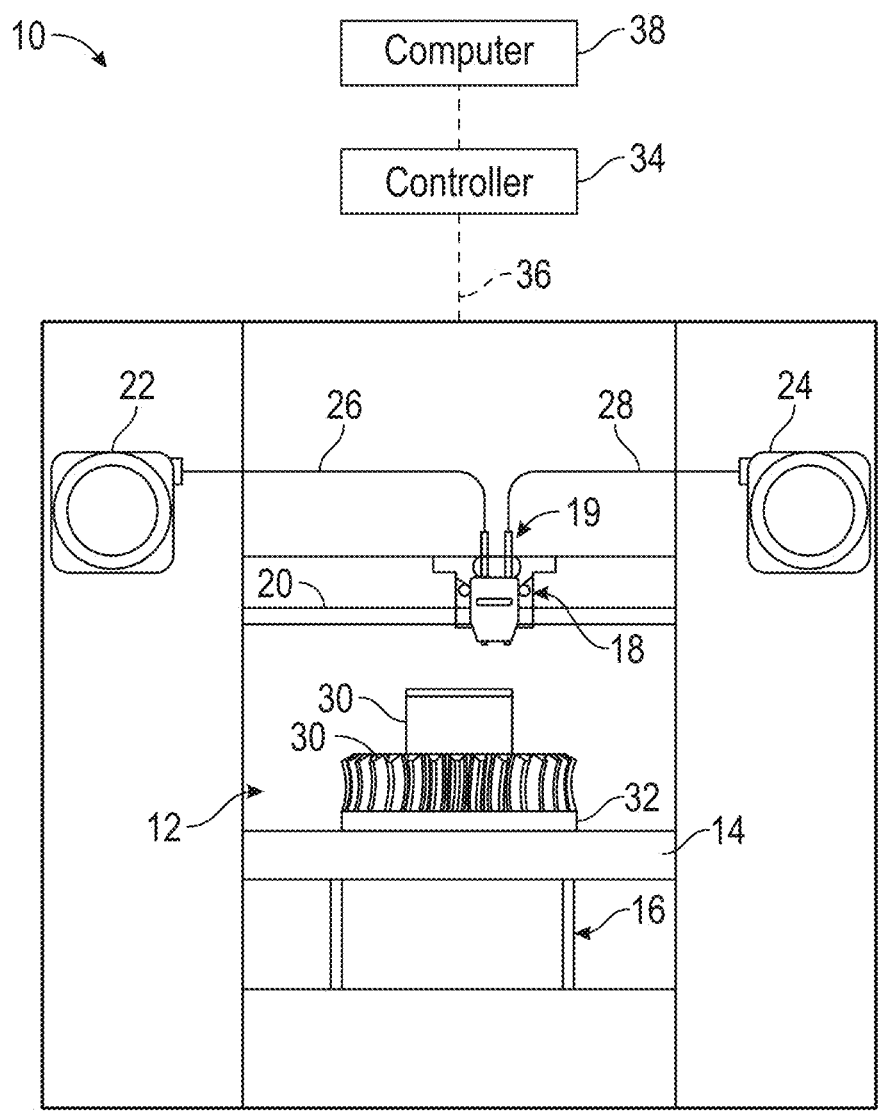
FIG. 1 is a front view of an additive manufacturing system configured to print 3D parts utilizing the radiation shielding feedstock.

The present disclosure is directed to a feedstock containing a polymeric matrix filled with radiation shielding materials for use in an additive manufacturing and a method for printing parts from the feedstock containing the polymeric matrix filled with radiation shielding materials. Utilizing additive manufacturing systems to produce radiation shielding 3D parts provides for flexibility to produce customized 3D parts that is not available with typical radiation shielding materials.

What is meant by radiation shielding is the ability to absorb radiation or to act as a dielectric. The ability to absorb radiation is the capture of some or all radiation entering a material, to block the radiation from physically passing through the material or a portion of the material. Absorption includes the attenuation of radiation. A radiation absorbing material as used herein has the ability to absorb gamma radiation.

What is meant by acting as a dielectric is the ability to redirect, modify or alter the path of radiation. A dielectric material is an insulating material or a very poor conductor of electric current. When a dielectric material is placed in an electric field, practically no current flows into it because, unlike a metal, it has no loosely bound, or free, electrons that may drift through the material. A dielectric material is an electrical insulator that can be polarized by an applied electric field. Although the term insulator implies low electrical conduction, dielectric typically means materials with a high polarizability. The latter is expressed by a number called the relative permittivity. A dielectric material as used herein has the ability to re-direct radio frequency waves.

There are several settings or applications where high intensity gamma radiation is expected to be encountered. These settings or applications include, but are not limited to, certain medical procedures, nuclear plant sites and outer space environments. In these settings or applications, it is necessary to provide appropriate shielding to mitigate the effects of radiation on the human body and/or electrical components.

For instance, gamma rays are found in outer space. For outer space applications, gamma ray radiation shielding of sensitive components is desired. X-rays are commonly used in the medical field to image parts of the body. Therefore, x-ray shielding of sensitive components is desired for the medical field. In the case of a nuclear facility, alpha, beta, gamma and neutron radiation can be present in a nuclear reactor. Therefore, radiation shielding from alpha, beta, gamma and neutron radiation is desired for nuclear facilities.

Materials used for radiation shielding are typically heavy, rigid materials such as high-density concrete, lead bricks, steel plates and cooling pools filled with water. However, due to the rigidity of many of these materials, the radiation shielding devices have limited geometries. Because of the weight of these materials, many, if not all, of these materials are not suitable for use in outer space. Also, lead is both heavy, and toxic.

Settings or applications where radio frequency radiation is encountered and required re-direction include, but are not limited to, antennas, radomes, low observable devices (devices that use stealth technology) and/or sensitive electronic parts.

Radiation shielding materials that can be processed in an additive manufacturing system allow for the manufacture of radiation shielding 3D parts with complex geometries that cannot be otherwise produced. Further, the printed radiation shielding 3D parts allows for selective placement of the radiation shielding materials for an optimized shielding to weight ratio, or to allow easier handling during installation. Further, when providing radiation shielding using a material with a dielectric material, density gradients by themselves or in combination with periodic surfaces can provide the necessary insulation for electric equipment to work properly in an environment with elevated radiation exposure.

The present disclosure includes a radiation shielding feedstock for use in an additive manufacturing system. The term "additive manufacturing system" refers to a 3D printer or system that prints, builds, or otherwise produces 3D items and/or support structures at least in part using an additive manufacturing technique. The additive manufacturing system may be a stand-alone unit, a sub-unit of a larger system or production line, and/or may include other non-additive manufacturing features, such as subtractive-manufacturing features, pick-and-place features, two-dimensional printing features, and the like.

The feedstock includes a polymeric matrix that is filled with radiation shielding particles, where the polymeric feedstock melts or becomes sufficiently flowable to print the 3D part while binding the particles within the matrix when sufficiently cooled. The particles must be sufficiently small to provide an extrudable mixture that is not highly viscous, while having a sufficient packing density to provide the desired amount of radiation shielding.

The polymeric matrix must be able to withstand the harsh radioactive environments with sufficiently little degradation. Also, when utilized in negative pressure environments, such as outer space, the choice of the polymer matrix must be one with low out-gassing. Out-gassing is the physical phenomenon in which entrapped volatiles such as water, monomer or solvents can transition to a gaseous state when subjected to a negative pressure environment. This is important because once free from the polymer matrix volatiles could re-condense on other equipment obscuring optics or electronics. For instance, polyphenylene sulfide (PPS) out-gasses in outer space, and acrylonitrile butadiene styrene (ABS) does not withstand the rigors of a radioactive environment.

In an exemplary embodiment, the build material includes a polymeric matrix of semi-crystalline polyetherketoneketone (PEKK). PEKK is an exemplary polymeric matrix because PEKK resists off gassing, is resistant to chemicals and harsh environments and is compatible with radiation shielding particles that can shield gamma radiation. Experimentation has demonstrated that PEKK is a particularly compatible polymer for accepting tungsten particle loading for purposes of radiation absorption and barium titanate ($BaTiO_3$) for purposes of providing a dielectric material with insulating effects, while maintaining suitable ductility and toughness to make a good filament feedstock.

While PEKK is an exemplary polymeric matrix for the build material, it is within the scope of the present disclosure to use one or more polyaryletherketone (PAEK) materials as the polymeric matrix for the build material. The PAEK family of materials include one or more polyetherketones (PEK), polyetheretherketones (PEEK), polyetherketoneketones (PEKK), polyetheretherketoneketones (PEEKK), polyetherketoneether-ketoneketones (PEKEKK), mixtures thereof, and the like ("PAEK family").

For example, the build material may include a polymeric matrix of a semi-crystalline polyetherketoneketone (PEKK) and a secondary material or materials that accelerate crystallization of the PEKK. The secondary material or materials are combined with the PEKK to form a blend wherein the PEKK is a largest component of the blend, wherein the blend is configured as a filament to be utilized in an additive manufacturing system. An exemplary secondary material includes a polyetheretherketone (PEEK).

In one embodiment, the semi-crystalline PEKK is between about 50 wt % and about 99 wt % of the polymeric matrix where the remainder of the polymeric matrix is PEEK. In another embodiment the semi-crystalline PEKK is between about 90 wt % and about 99 wt % of the polymeric matrix where the remainder is PEEK. In another embodiment, the semi-crystalline PEKK is about 95 wt % of the polymeric matrix and the PEEK is about 5 wt % of the polymeric matrix.

The PAEK family blend is useful as the polymeric matrix for radiation shielding 3D parts because the feedstock filament material is not brittle or fragile when fed into an additive manufacturing device, the material easily melts and flows through the extruder and into toolpaths, which aids in the manufacturing of 3D parts by additive manufacturing systems. Further, the PAEK family blend enables the fabrication of parts which are tough and able to withstand the rigors of the radioactive environments. Finally, the PAEK family blend does not out-gas when used in negative pressure environment, such as outer space.

An exemplary radiation shielding material that is useful for absorbing radiation in additive manufacturing feedstocks is tungsten particles. While tungsten is an exemplary radiation absorbing material, other radiation absorbing materials can be utilized in the feedstock including, but not limited to, tantalum, silver, molybdenum, bismuth, iron, steel, stainless steel, copper, brass, bronze, zinc, aluminum, beryllium, manganese, barium sulfate, arsenic powder and combinations thereof.

An exemplary radiation shielding material that is useful as a dielectric particle for a 3D printing feedstock is barium titanate. While barium titanate is an exemplary radiation shielding particle for dielectric materials, other particle materials can be utilized in the feedstock including, but not limited to various conjugated polymers, lead ziconate titanate, calcium copper titanate, barium strontium titanate, strontium titanate or other inorganic fillers having a cubic perovskite structures.

In an FDM process, a liquefier is used to extrude molten material through a tip orifice with a substantially circular opening, typically ranging from about 125 micrometers (about 0.005 inches) to about 510 micrometers (about 0.020 inches). Examples of liquefier tubes with extrusion tips are disclosed in Swanson et al. U.S. Pat. No. 10,029,415 and Swanson et al. U.S. Pat. No. 8,647,098, both of which are incorporated by reference in their entireties.

The size of the particles of the radiation shielding materials can be any size distribution that does not create an overly viscous mixture which cannot be pumped through an additive manufacturing device; a highly viscous mixture will result in plugging of an extrusion nozzle. For some extruders, the particles can range to an upper limit of about 25 µm without blocking or plugging the nozzle. More particularly, the size of the particles of the radiation shielding materials range from about 0.1 µm to about 10 µm. In some instance, particles having a size ranging from about 0.1 µm to about 5.0 µm are utilized to increase packing density. In other instances, particles having a size ranging from about 0.1 µm to about 1.5 µm are utilized to increase packing density. The particle size distribution in a given feedstock may in any case include multiple sizes of particles within the acceptable range.

Due to the size of the particles, larger particles may more effectively block more radiation than smaller particles. However, depending on particle size, larger particles do not have as efficient a packing density as that of smaller particles, meaning that a polymeric matrix filled with larger particles may have paths through which radiation can pass. Persons skilled in the art will recognize that particle size and distribution can be selected and may be varied to optimize the radiation shielding effectiveness of the feedstock material and the resulting printed part. The packing density may be increased by increasing the amounts of smaller particles. It should be understood, however, that additively printed part features will benefit from multiple printed layers of the radiation shielding material with each layer having its own distribution of blocking particles, resulting in an overall effective shielding property.

The weight percent of the radiation shielding material particles relative to the total weight of the feedstock must balance the demand to block radiation and the need to melt process the feedstock within an additive manufacturing system. If the weight percent of the radiation shielding material particles is sufficiently large, meaning the weight percent of polymeric matrix is decreased, then pumpability/flowability can become an issue, and lead to manufacturing defects and/or manufacturing failures. Further, if the weight percent of the radiation shielding material particles is sufficiently high, then the 3D part may become brittle and crack and/or fail in harsh conditions due to the lack of the binding polymeric matrix. Therefore, the material must have a sufficient amount of polymeric matrix to bind the particulates.

The material must also provide sufficient radiation shielding to protect the personnel and/or electrical equipment from the radioactive environment. As such, the feedstock includes a lower weight percent of radiation shielding particles, which will increase ease of manufacturing and reduce filament brittleness, then more part thickness (FDM layers) will be required to provide the necessary shielding from radiation. Depending upon the application, larger or thick parts may not be desirable, such as for parts in outer space, where efficiency of size and weight are important.

In balancing the above factors and the type of radiation shielding material utilized, the disclosed feedstock includes between about 50 wt % to less than 90 wt % of the radiation shielding material particles based upon the total weight where the remainder weight percent includes the polymeric matrix and optionally a lubricant which may aid the additive manufacturing process.

In applications, where the radiation shielding material such as, but not limited to, barium titanate is used as a dielectric to provide insulation or to redirect the path of the radiation, the disclosed feedstock includes between about 50 wt % and about 75 wt % of the radiation shielding material particles based upon the total weight where the remainder weight percent includes the polymeric matrix and the optional lubricant. More particularly, the feedstock includes between about 55 wt % and about 65 wt % of the radiation shielding material particles based upon the total weight where the remainder weight percent includes the polymeric matrix and the optional lubricant. Even more particularly, the feedstock includes between about 58 wt % and about 62 wt % of the radiation shielding material particles based upon the total weight where the remainder weight percent includes the polymeric matrix and the optional lubricant.

The feedstock filled with the radiation shielding material particles for use as a dielectric includes between about 25 wt % and about 50 wt % of the PAEK family polymer matrix based upon the total weight of the feedstock. More particularly, the feedstock includes between about 35 wt % and about 45 wt % of the PAEK family polymer matrix based upon the total weight of the feedstock. Even more particularly, the feedstock includes between about 48 wt % and about 52 wt % of the PAEK family polymer matrix based upon the total weight of the feedstock.

In applications, where the radiation shielding material such as, but not limited to, tungsten is used to attenuate radiation, the feedstock includes between about 70 wt % and less than 90 wt % of the radiation shielding material particles based upon the total weight where the remainder weight percent includes the polymeric matrix and the optional lubricant. Even more particularly, the feedstock includes between about 70 wt % and about 85 wt % of the radiation shielding material particles based upon the total weight where the remainder weight percent includes the polymeric matrix and the optional lubricant.

The feedstock filled with the radiation shielding material particles used to attenuate radiation includes between about 10 wt % and about 35 wt % of the PAEK family polymer matrix based upon the total weight of the feedstock. More particularly, the feedstock includes between about 10 wt % and about 30 wt % of the PAEK family polymer matrix based upon the total weight of the feedstock. Even more particularly, the feedstock includes between about 15 wt % and about 30 wt % of the PAEK family polymer matrix based upon the total weight of the feedstock.

The feedstock for use as a dielectric or to attenuate radiation can optionally include processing aids, such as high temperature lubricants. The high temperature lubricants can reduce friction within a liquefier and also reduce abrasion of the metal extrusion tip. The optional lubricants include, but are not limited to, boron nitride, high molecular weight silicon, polytetrafluoroethylene (PTFE), polyhedral oligomeric silsesquioxane (POSS) and molybdenum disulfide. The high temperature lubricants can be added to the radiation shielding feedstock in the range of about 0.5 wt % to about 10.0 wt % based upon the total weight of the feedstock. More particularly, the high temperature lubricant can be added to the radiation shielding feedstock in the range of about 1.0 wt % and about 8.0 wt %.

FIG. 1 is a schematic front view of an exemplary additive manufacturing system 10. As shown in FIG. 1, system 10 is an extrusion-based additive manufacturing system for printing or otherwise building 3D parts and support structures using a layer-based, additive manufacturing technique, where the 3D part can be printed from part material and support structures can be printed from support material. Suitable extrusion-based additive manufacturing systems for system 10 include fused deposition modeling systems developed by Stratasys, Inc., Eden Prairie, Minn. nder the trademark "FDM".

In the illustrated embodiment, system 10 includes chamber 12, platen 14, platen gantry 16, print head 18, head gantry 20, and consumable assemblies 22 and 24. Chamber 12 is an enclosed environment that contains platen 14 and any printed objects. Chamber 12 can be heated (e.g., with circulating heated air) to reduce the rate at which the part and support materials solidify after being extruded and deposited. In alternative embodiments, chamber 12 can be omitted and/or replaced with different types of build environments. For example, parts can be built in a build environment that is open to ambient conditions or may be enclosed with alternative structures (e.g., flexible curtains).

Platen 14 is a platform on which printed parts and support structures are printed in a layer-by-layer manner. In some embodiments, platen 14 may also include a flexible polymeric film or liner on which the printed parts and support structures are printed. In the illustrated example, print head 18 is a dual-tip extrusion head configured to receive consumable filaments from consumable assemblies 22 and 24 (e.g., via feed tube assemblies 26 and 28) for printing 3D part 30 and support structure 32 on platen 14. Consumable assembly 22 may contain a supply of a part material, such as a high-performance part material, for printing printed part 30 from the part material. Consumable assembly 24 may contain a supply of a support material for printing support structure 32 from the given support material.

Platen 14 is supported by platen gantry 16, which is a gantry assembly configured to move platen 14 along (or substantially along) a vertical z-axis. Correspondingly, print head 18 is supported by head gantry 20, which is a gantry assembly configured to move print head 18 in (or substantially in) a horizontal x-y plane above chamber 12. In an alternative embodiment, platen 14 may be configured to move in the horizontal x-y plane within chamber 12 and print head 18 may be configured to move along the z-axis. Other similar arrangements may also be used such that one or both of platen 14 and print head 18 are moveable relative to each other over a desired number of degrees of freedom. Platen 14 and print head 18 may also be oriented along different axes. For example, platen 14 may be oriented vertically and print head 18 may print printed part 30 and support structure 32 along the x-axis or the y-axis.

The print head 18 can have any suitable configuration. Examples of suitable devices for print head 18, and the connections between print head 18 and head gantry 20 include those disclosed in Crump et al., U.S. Pat. No. 5,503,785; Swanson et al., U.S. Pat. No. 6,004,124; LaBoissiere, et al., U.S. Pat. Nos. 7,384,255 and 7,604,470; Leavitt, U.S. Pat. No. 7,625,200; Batchelder et al., U.S. Pat. No. 7,896,209; Comb et al., U.S. Pat. No. 8,153,182; Leavitt, U.S. Pat. No. 7,625,200; and Swanson et al., U.S. Pat. Nos. 8,419,996 and 8,647,102.

System 10 also includes controller 34, which can include one or more control circuits configured to monitor and operate the components of system 10. For example, one or more of the control functions performed by controller 34 can be implemented in hardware, software, firmware, and the like, or a combination thereof. Controller 34 can communicate over communication line 36 with chamber 12 (e.g., with a heating unit for chamber 12), print head 18, and various sensors, calibration devices, display devices, and/or user input devices.

System 12 and/or controller 34 can also communicate with computer 38, which can include one or more discrete computer-based systems that communicate with system 12 and/or controller 34, and may be separate from system 12, or alternatively may be an internal component of system 12. Computer 38 includes computer-based hardware, such as data storage devices, processors, memory modules, and the like for generating and storing tool path and related printing instructions. Computer 38 may transmit these instructions to system 10 (e.g., to controller 34) to perform printing operations.

A digital model representative of a 3D part to be printed can be created, such as by scanning a 3D part using known methods such as digital photography, laser scanning, or the like, or such as by drawing a 3D part using a computer-aided design (CAD) program. The digital model and/or instructions for printing the model can be loaded into computer 38. The computer 38 can communicate with controller 34, which serves to direct the system 10 to print the 3D part 30 and optionally, a support structure 32. Part and material is deposited in layers along toolpaths that build upon one another to form the 3D part 30.

Figure 2:
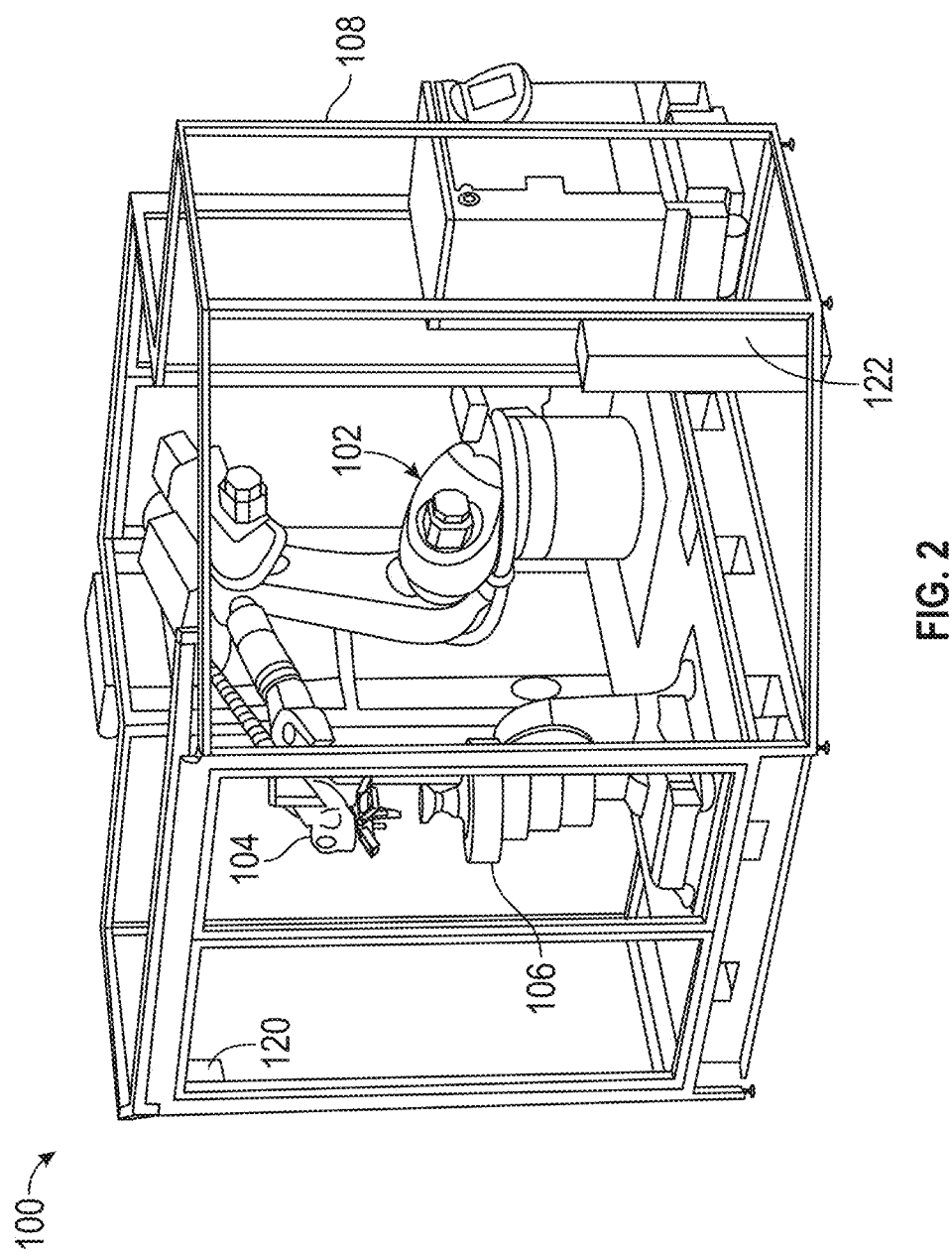
FIG. 2 is a schematic view of another additive manufacturing system configured to print 3D parts utilizing the radiation shielding feedstock.

FIG. 2 is a perspective view of a multi-axis robotic build system 100 that may be used for building three-dimensional (3D) parts utilizing two-dimensional tool paths, three-dimensional tool paths and combinations thereof. System 100 includes in one embodiment a robotic arm 102 capable of movement along six axes. An exemplary robotic arm is an industrial robot manufactured by KUKA Robotics of Augsburg, Germany. While six axes of motion are discussed for the robotic arm 102 from a stationary base, it should be understood that additional axes or other movements are also amenable to use with the embodiments of the present disclosure, without departing therefrom. For example, the robotic arm 102 could be mounted to move on a rail or a gantry to provide additional degrees of freedom. The robotic arm 102 carries a print head 104, such as an extrusion head 104 for printing parts from a filament feedstock. A build platform 106 is provided, which in one embodiment is movable along two axes of rotation, rotation about the z-axis, and tilting (rotation) about the x-axis. A controller 108 contains software and hardware for controlling the motion of the robotic arm 102 and the build platform 106, as well as the printing operation of the print head 104.

A generated tool path is utilized to control motion of the robotic arm 102. However, control of the extrusion head is also used to accurately deposit material along the generated tool path. For example, one embodiment of the present disclosure synchronizes timing of the motion of the robotic arm 102 with print head 104 to extrusion from the print head 104. Embodiments of the present disclosure provide for speed up or slowdown of printing, changing the extrusion rate in conjunction with robotic movements, tip cleaning, tip changing, and other actions of the print head 104 based on the generated tool path and motion of the robotic arm 102. As an example, extrusion from the print head 104 may be synchronized with motion of the robotic arm 102 in manners taught by Comb et al. U.S. Pat. No. 6,054,077; and Comb U.S. Pat. Nos. 6,814,907, 6,547,995, and 6,814,907.

Radiation Absorbing Materials

When utilizing extrusion based additive manufacturing, the level of radiation shielding or absorption (such as, but not limited to, gamma ray absorption) will vary depending upon the selected build pattern utilized to print the part, the thickness of the part and the amount of radiation shielding particles within the feedstock. Further, because the part is printed with the additive manufacturing system, the part can be printed with both radiation shielding material in areas requiring shielding and other areas with polymeric material without radiation shielding materials to decrease both weight and cost.

Given the particular application requiring the use of a gamma radiation absorbing material, the level of attenuation required can be achieved by the modulation of relative material thickness normal to the incident angle of gamma radiation energy. Typically, the rate of absorption is significantly dependent on the linear attenuation coefficient of the radiation absorbing material and thickness.

Figure 3:
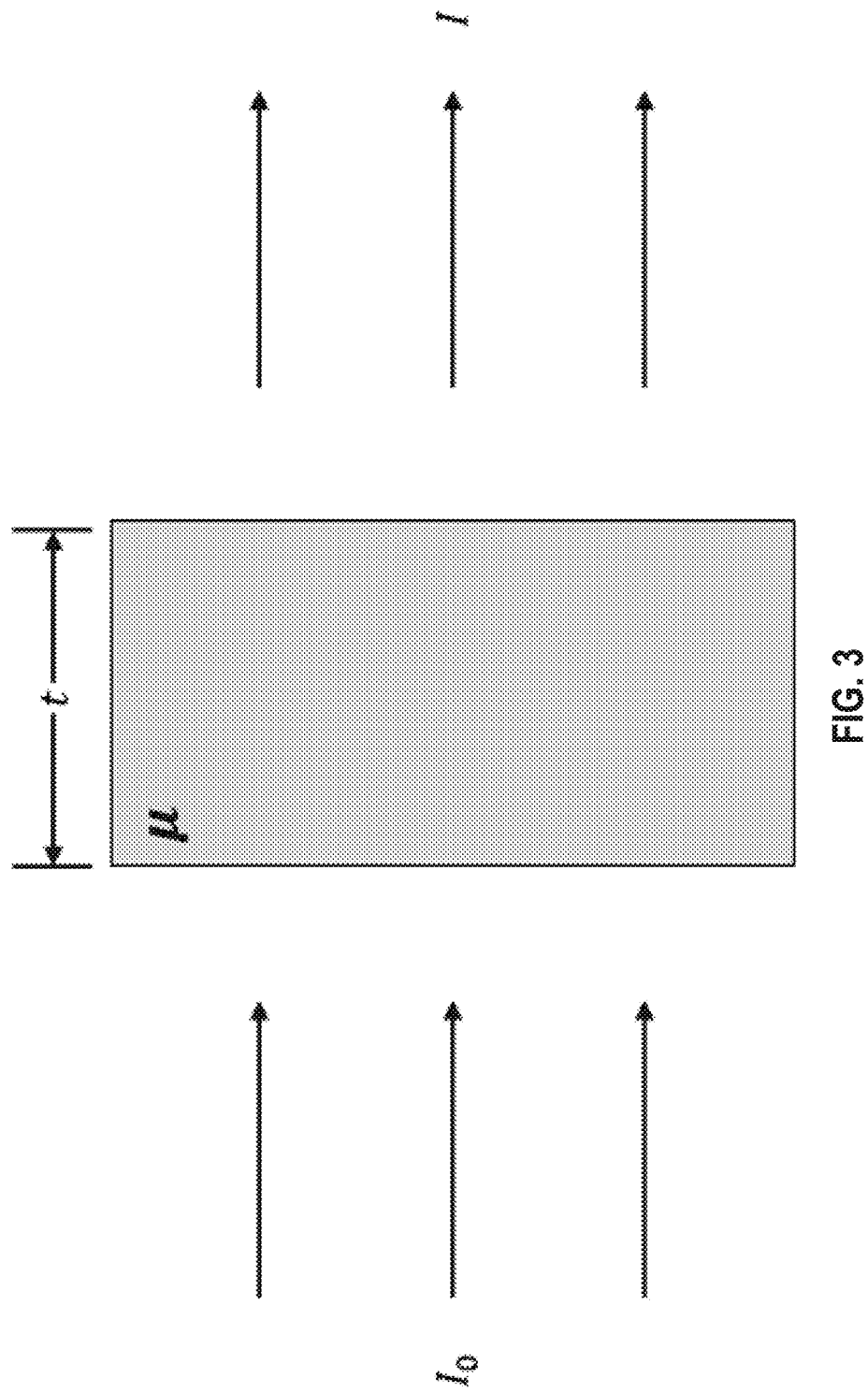
FIG. 3 illustrates a simple example of radiation attenuation utilizing a part having radiation attenuating or blocking materials.

FIG. 3 illustrates a simple absorption example. When gamma radiation of intensity $I_0$ is incident to the attenuating material thickness x, density $\rho$, linear attenuation coefficient $\mu$, the emerging intensity (I) transmitted by the radiation absorbing material is given by the exponential attenuation law expression found in Equation 1.

$$\frac{I}{I_0} = e^{-(\mu/\rho)x} \quad \text{(Equation 1)}$$

As Equation 1 illustrates, the transmitted intensity will be less than the incident intensity due to the attenuating effects of the radiation shielding material. The magnitude of the absorption is dependent on the emission energy level as well as the thickness of the radiation shielding material. For an infinitesimally small change in radiation shielding material thickness is defined by the following equation:

$$-dI \propto I \cdot dx \quad \text{(Equation 2)}$$

As such, the intensity is reduced by the radiation shielding material, shown by −dI, which translates to the following equation provided $\mu$ is a constant for a specific radiation shielding material:

$$-dI = (\mu/\rho) I \cdot dx \quad \text{(Equation 3)}$$

Dividing and integrating Equation 2, given a change in thickness with respect to I, results in the following equations:

$$-\frac{dI}{I} = (\mu/\rho) \cdot dx \quad \text{(Equation 4)}$$

$$-\int_{I_0}^{I_x} \frac{dI}{I} = (\mu/\rho) \int_0^x dx \quad \text{(Equation 5)}$$

$$\ln\left(\frac{I_x}{I_0}\right) = -(\mu/\rho)x \quad \text{(Equation 6)}$$

$$\frac{I_x}{I_0} = e^{-(\mu/\rho)x} \quad \text{(Equation 7)}$$

As such, Equation 1 can be rewritten as:

$$\mu/\rho = x^{-1} \ln(I_0/I) \quad \text{(Equation 8)}$$

The tabulations of $\mu/\rho$ rely heavily on theoretical values for the total cross section per atom, $\sigma_{tot}$ which is also related to $\mu/\rho$ according to the following equation:

$$\mu/\rho = \sigma_{tot} N_A / (uA) \quad \text{(Equation 9)}$$

where $N_A$ is Avogadro's number ($6.022045 \times 10^{23}$ mol$^{-1}$), u is the atomic mass unit, A is the relative atomic mass of the target element, and $\sigma_{tot}$ is the total cross section for an interaction by the photon.

The total cross section can be generally written as the sum over contributions from the principal photon interactions.

$$\sigma_{tot} = \sigma_{PE} + \sigma_{CE} + \sigma_{PP} \quad \text{(Equation 10)}$$

where $\sigma_{PE}$ is photoelectric effect, $\sigma_{CE}$ is compton scattering and $\sigma_{pp}$ is pair production.

Provided below are a series of equations used to determine the thickness of a thermoplastic composite matrix material with tungsten particles dispersed within the polymer matrix which is attenuated with source $^{60}$Co of emission energy level 1.33 MeV.

$$\mu/\rho = x^{-1} \ln(I_0/I) \quad \text{(Equation 11)}$$

$$\mu/\rho = \frac{\ln(I_0/I)}{x} \quad \text{(Equation 12)}$$

$$\mu/\rho = \frac{\ln(I_0/I)}{\rho t} \quad \text{(Equation 13)}$$

$$\mu = \frac{\ln(I_0/I)}{t} \quad \text{(Equation 14)}$$

$$t = \frac{\ln(I_0/I)}{\mu} \quad \text{(Equation 15)}$$

Figure 4:
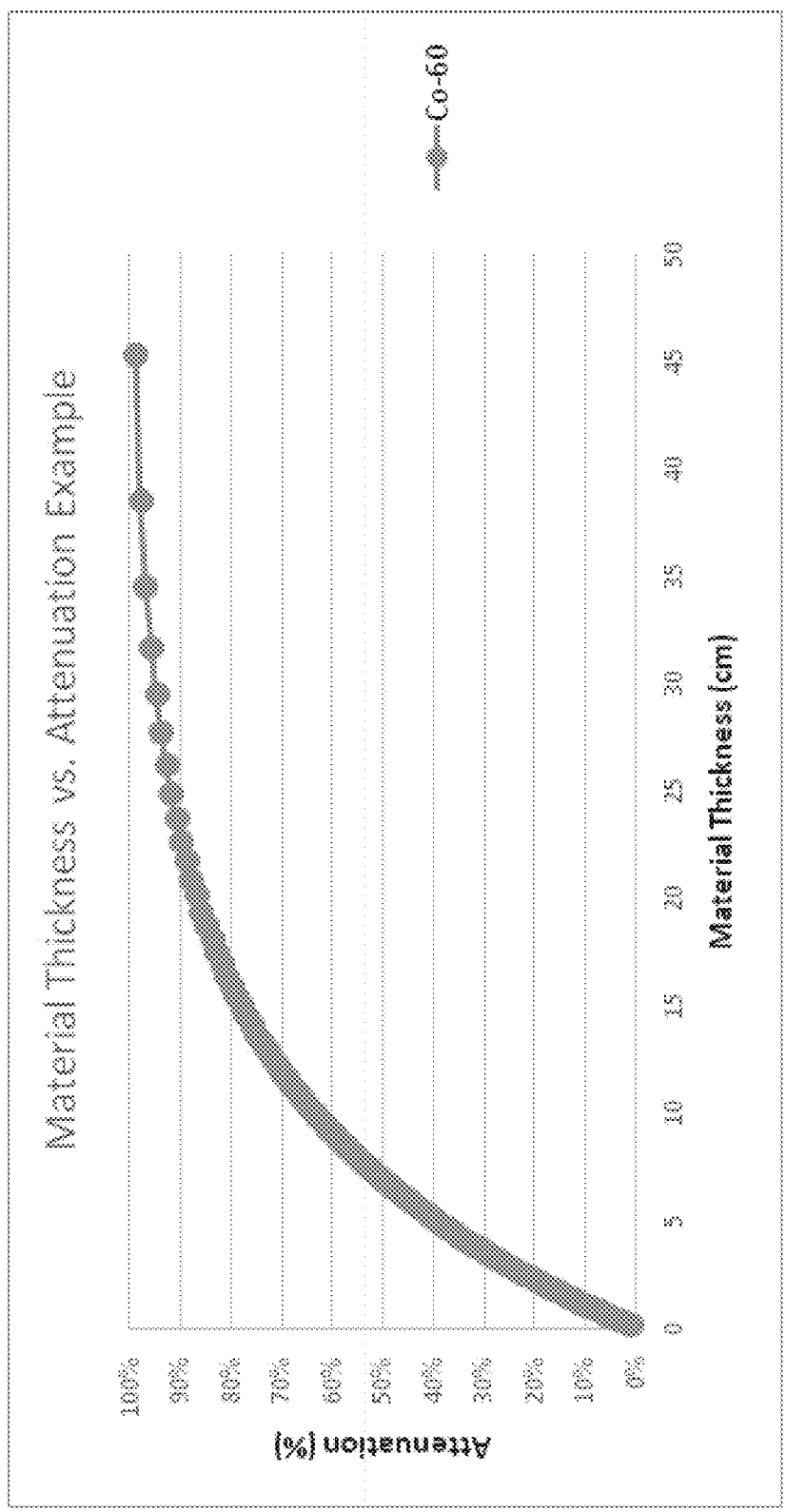
FIG. 4 is an exemplary graph of attenuation versus part thickness.

FIG. 4 illustrates an exemplary graph of attenuation versus thickness of part containing radiation shielding material. FIG. 4 illustrates that as thickness increases, attenuation increase for a particular element, assuming a constant density of the radiation absorbing material.

For instance, assuming the source and intensity of the radiation is known, the amount of absorption required to sufficiently protect sensitive equipment or personnel is known, and the amount and type of shielding material is known, then the amount of absorption by part thickness can be determined. Provided the part thickness is within the spatial parameters provided to protect the sensitive equipment and/or personnel, then the part can be printed in a layer-wise manner using a fused deposition modeling additive manufacturing system.

Using the graph in FIG. 4 and Equation 15 and knowing that about 50% radiation absorption is required, leads to a determination that a part of about 7.5 cm is required. If the part fits within the allotted space, then an electronic model can be created and sliced, as mentioned above. By way of non-limiting example, assuming that a 0.016 inch outlet diameter tip is utilized with any of model of a FORTUS® fused deposition modeling additive manufacturing system, commercially available from Stratasys, Inc. located in Eden Prairie, Minn., that produces a road of material that is 10 microns (0.01 millimeters) in height, then the part can be printed in 7,500 layers.

However, if the thickness of the part exceeds the provided space, then the weight percent of the radiation absorbing particles can be increased a selected weight percent using the known physical properties of the radiation absorbing material. The increase of the weight percent of the radiation shielding material increases the density of the material, and therefore the weight of the part. In many applications, increasing the weight of the part has no detrimental effects. However, when used in low pressure or vacuum environments, such as outer space, radiation absorption should be balanced with the weight of the part.

Alternatively, if the size of the part to be printed is fixed and the amount of radiation absorption exceeds what is required, the weight percent of radiation absorbing material in the feedstock can be reduced. The reduction in weight, while providing the necessary radiation absorption, is useful in low pressure or vacuum environments, such as outer space.

Dielectric Materials

The use of dielectric materials in extrusion based additive manufacturing systems allows parts to be printed that can manipulate radio frequency radiation by redirecting or altering the path of the radiation. Antennas and cloaking are examples of equipment that require radio frequency wave re-direction and can be 3D printed using the dielectric materials of the present invention. In some embodiments, redirecting or altering the path of the RF radiation provides insulative protection for electronic or sensitive parts or to insulate electronic or sensitive parts from interfering with each other. For instance, parts printed polymeric based material with PAEK based polymers such as, but not limited to, polyetherketoneketone (PEKK) loaded with a dielectric material such as, but not limited to, barium titanate, can be utilized to protect antennas, low observable devices (devices that use stealth technology). The disclosed feedstock material is capable of insulating parts from and/or redirecting radiation because the dielectric material acts as an insulator when subjected to an electric field.

Barium titanate is useful as a dielectric due to its high relative permittivity, also referred to as a dielectric constant. Barium titanate has a relative permittivity (dK) of 1200 at 20° C. When provided in a polymeric matrix configured for use as a feedstock for an extrusion based additive manufacturing system at loading levels similar to those used in Example 4, the material has a relative permittivity of between about 6 and about 10, and more particularly between about 8 and about 10, both as measured in the X-band frequency of between about 8.2 GHz and about 12.4 GHz. The loss tangent of the disclosed material is less than or equal to about 0.02 as measured in the X-band frequency of between about 8.2 GHz and about 12.4 GHz.

The disclosed material allows the manufacturing of radiofrequency devices or parts with tailored relative permittivity (dK) values. Because the feedstock material can be used to print parts using extrusion based additive manufacturing systems, the parts can be printed with complex geometries that are not otherwise being able to be manufactured that have tailored dK values.

Because of the capability to print complex parts, parts can be printed with desired dK values while including voids, which decreases the weight of the part. Reducing the weight of the part, while maintaining desired dK values, is beneficial in many applications, including, but not limited to applications in space and the aerospace industry.

Figure 5:
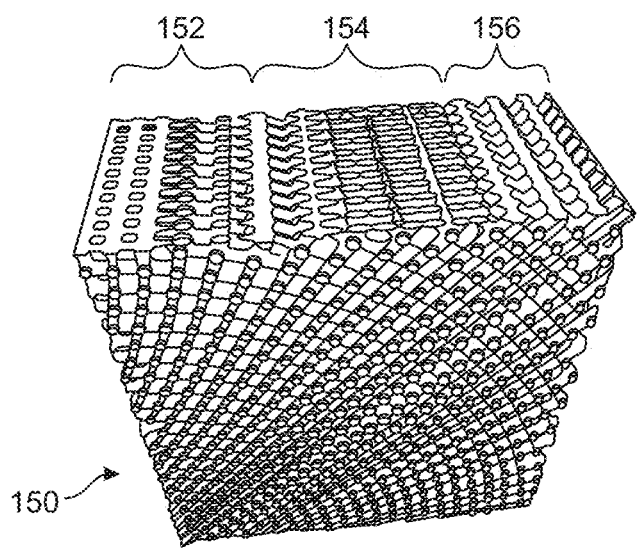
FIG. 5 is an illustration of a part printed with a polymeric based material containing dielectric particles, where the part has differing density gradients and periodic surfaces.

Referring to FIG. 5, an exemplary part that was 3D printed from a dielectric material of the present invention and configured for the re-directions of waveforms is shown as antenna 150. The antenna 150 includes portions 152, 154 and 156 having different density gradients and different periodic surfaces with gaps therein. The differing periodic surfaces and density gradients advantageously allows the dielectric constant dK to be varied and controlled through the volume of the part to provide the desired radiation shielding while controlling the size and weight of the antenna 150.

An advantage of being able to produce light weight parts, such as antenna 150, with tailored dK values due to the use of differing periodic surfaces and density gradients is that equipment that typically has to be separated due to interference with each other can now be consolidated into a compact space because the part 150 insulates one piece of equipment from another piece of equipment. By way of non-limiting example, multiple radomes, antennas and lenses can be utilized in a more compact device without interference from each other through the use of the part 150 having the differing periodic surfaces and density gradients.

Figure 6:
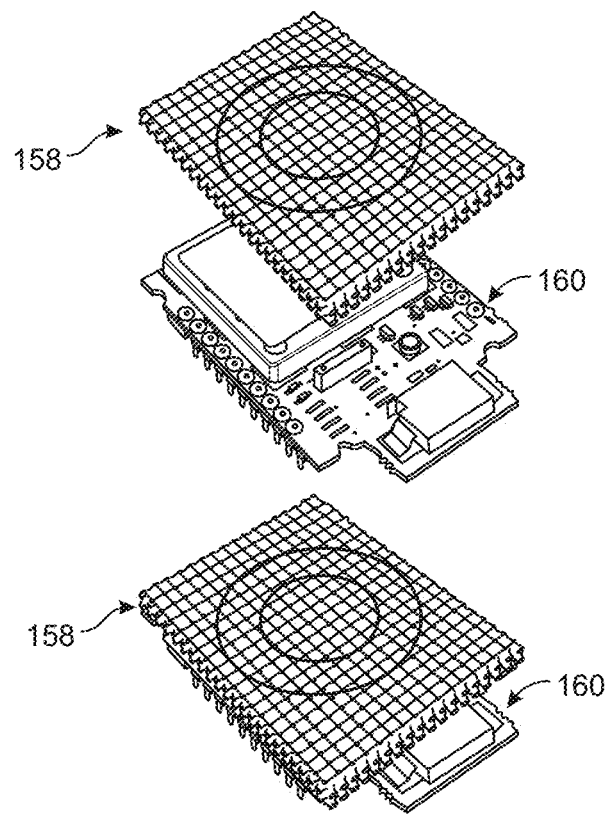
FIG. 6 is an illustration of the part of FIG. 5 used to decouple antennas.

Referring to FIG. 6, a schematic view of a plurality of 3D printed antennas 158 used in an array with an electronic component 160 is illustrated. Antennas 158 may be configured with same or differing periodic surface and density gradients, in complex and custom geometries not manufacturable using traditional subtractive or injection molding manufacturing methods. The complex and custom geometries allow the antennas 160 to manipulate the RF waves in a compact arrangement without interference from each other. Further, additional antennas 158 may be added to an array without affect the performance of the other antennas within the array.

Figure 7:
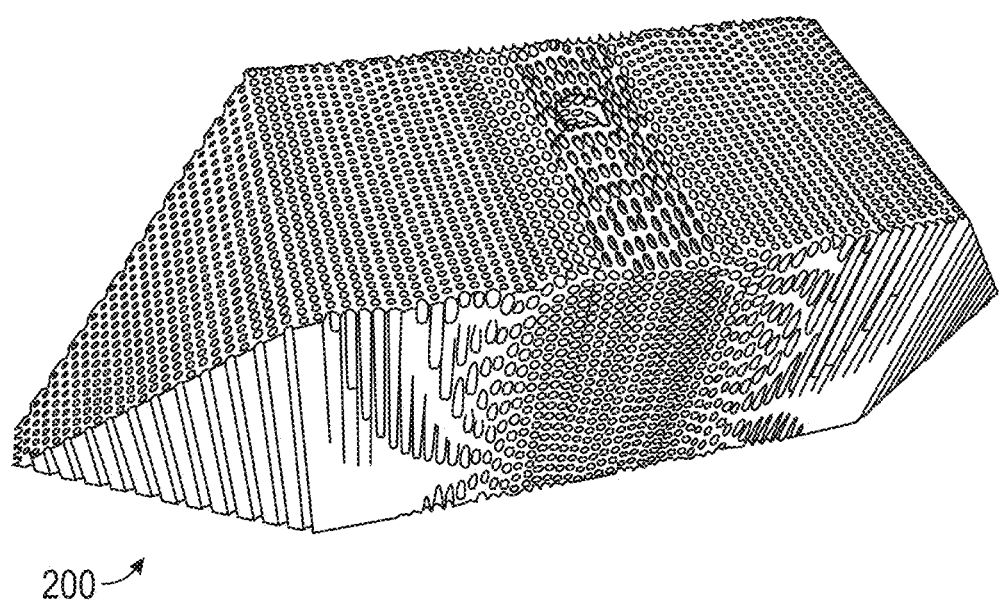
FIG. 7 is an illustration of a part having a spatially variant structure which can provide a metamaterial cloak.

Because parts having complex geometries can be printed with dielectric materials, parts can be printed that have cloaking properties. Referring to FIG. 7, a part 200 is illustrated with a spatially variant structure. The spaces or voids in the part 200 can be anisotropic in nature so as to provide desired physical properties, such as a metamaterial cloak by manipulating the path of the radiation.

EXAMPLES

The present disclosure is more particularly described in the following examples that are intended as illustrations only, since numerous modifications and variations within the scope of the present disclosure will be apparent to those skilled in the art.

Example 1

Formulation 1 consisting of 28.25% by weight PEKK (commercially available under the KEPSTAN® 6004 trademark by Arkema, Inc. located in King of Prussia, Pa.), and 71.75% Tungsten (commercially available from by Inframat Advanced Materials, LLC located in Manchester, Conn. under the 74MR-0001 designation) was prepared by melt blending in a co-rotating twin screw extruder as described below. Formulation 2 consisting of 28.25% by weight PEI (commercially available as ULTEM 9085 from Sabic located in Riyadh, Saudi Arabia) and 71.75% Tungsten was prepared in the same manner.

The various components of formulation 1 were separately fed into the throat of a 27 MAXX co-rotating extruder (Leistritz Nuernberg, Germany) at a speed of 150 rpm and a feed rate of 60 lbs/hr. All materials were melt processed using the following temperature profile: Z1: 300° C., Z2: 310° C., Z3-Z9: 320° C., Die: 320° C. The resulting compound was air cooled before being pelletized into 3 mm pellets. The resulting pellets were tested for rheological properties, injection molded and turned into filament for physical property testing on both molded and printed articles. The various components of formulation 2 were melt blended in the same manner as formulation 1 only using the following extrusion temperature profile: Z1-Z3: 320° C., Z4-Z5: 300° C., Z6-Z9: 290° C., Die: 290° C.

Filament production for formulation 1 was performed on a Davis Standard 1.25" single screw extruder model #12H commercially available from Davis Standard (Pawcatuck, Conn., 06379 USA) equipped with a 0.088" 5:1 L/D die at an extrusion speed of 29 PRM resulting in a line speed of 70 feet/min using the following temperature profile: Z1: 615° C., Z2: 650° C., Z3: 640° C., Clamp: 600° C., Die: 605° C. The resulting filament was cooled and collected for printing/testing purposes using pulling and spooling equipment that one skilled in the art would be familiar with.

Filament production for formulation 2 was performed on a Davis Standard 1.25" vented single screw extruder model #HPE commercially available from Davis Standard (Pawcatuck, Conn., 06379 USA) equipped with a 0.082" 5:1 L/D die at an extrusion speed of 23 PRM resulting in a line speed of 45 feet/min using the following temperature profile: Z1: 480° C., Z2: 510° C., Z3: 515° C., Z4: 510° C., Z5: 540° C., Clamp: 580° C., Die: 595° C. The resulting filament was cooled and collected for printing/testing purposes using pulling and spooling equipment that one skilled in the art would be familiar with.

Printer integration for formulation 1 was performed on a FORTUS 450 MC using a T20 tip (0.020 tip diameter) and extrusion temperature of 400° C. and a chamber temp of 145° C. PEKK break away support system (BASS) material was used as the support material and printing was performed on high temperature foundation sheets.

Printer integration for formulation 2 was performed on a FORTUS 450 MC using a T20 tip and extrusion temperature of 375° C. and a chamber temp of 170° C. PEI BASS was used as the support material and printing was done on high temperature foundation sheets.

Injection molding of both formulations were performed on a Milacron Magna T 55 injection molding machine commercially available from Milacron, Chicago Ill., USA equipped with a mold capable of creating ASTM D638 dog bones and D790 flex bars.

Filament for use in a 3D printer must stand up to some basic physical requirements in order to make it through the feed path in the printer to the print head. One such physical requirement is the ductility of the filament. If a filament is not sufficiently ductile, it will not remain as an intact strand of filament to supply to the AM system. A filament composition that is too brittle will snap as it is wound on a filament spool, or if the curvature of its path bends too tightly. Also, it will not pass through a feed path without breaking; the drive wheels of a print head provide compressive force on the filament as it is forced through the extrusion process. Less than adequate ductility value will cause the filament to break, resulting in print failure issues.

One test used to determine whether a filament feedstock material can withstand the feed path and extrusion force is a called a tensile loop test. A tensile loop test was performed using a 4.5 foot length of 0.070 inch diameter filament placed in a special fixture created to hold filament for tensile testing. In this test, five specimens were tested and peak load reported in pounds force (lbf or $lb_f$).

Table 1 provides the results from tensile loop testing of a PEKK/tungsten compound of the present invention, as compared to a PEI/tungsten compound. The radiation-absorbing PEKK matrix material was shown to have a far superior tensile strength to the radiation-absorbing PEI matrix material, in a range that would readily sustain the feed path and extrusion forces of commercial 3D printers. PEI/tungsten material data indicates that its ductility is at or below a minimal level for adequate additive manufacturing of parts using the current additive manufacturing systems, as compared to the PEKK/tungsten which demonstrates a robust ductility which is suitable for the current additive manufacturing systems.

TABLE 1

| Sample | Peak Load (lbf) | Std. Dev. |
|---|---|---|
| Formulation 1 (PEKK/Tungsten) | 81.24 | 0.77 |
| Formulation 2 (PEI/Tungsten) | 1.88 | 0.16 |

Physical properties comparing the two formulations were obtained by tensile, flex and tensile loop testing. Tensile and flex testing were performed according to ASTM D638 and ASTM D790 standards respectively using an MTS Criterion model #43 universal test system commercially available from MTS System Corporation Eden Prairie, Minn., USA. Table 2 shows the comparisons between PEKK/tungsten and PEI tungsten formulations for both molded and printed specimens.

TABLE 2

| Sample | Tensile Strength (psi) | Tensile elongation (%) | Flex modulus |
|---|---|---|---|
| Formulation 1 molded | 12800 | 7.29 | 724000 |
| Formulation 2 molded | 11100 | 2.70 | 674000 |
| Formulation 1 printed (XZ) | 10800 | 1.45 | * |
| Formulation 2 printed (XZ) | 3400 | 0.92 | * |

Table 1: *Flex data only obtained for injection molded parts 5 specimens were tested per formulation Example 2

Rheological measurements to determine the thermal stability over time of the PEI/tungsten and PEKK/tungsten formulations were obtained using an ARES parallel plate rheometer. Samples were prepared by pressing a round disc from compounded pellets suitable for placing between the plates of the rheometer. A chamber temperature of 325° C. was used for PEI and 345° C. for PEKK. A time sweep using a rotational speed of 5 rad/s at 1% strain for a total of 30-60 minutes was performed to determine if the viscosity of the material changes due to degradation and/or crosslinking of the polymer matrix over time.

Figure 8:
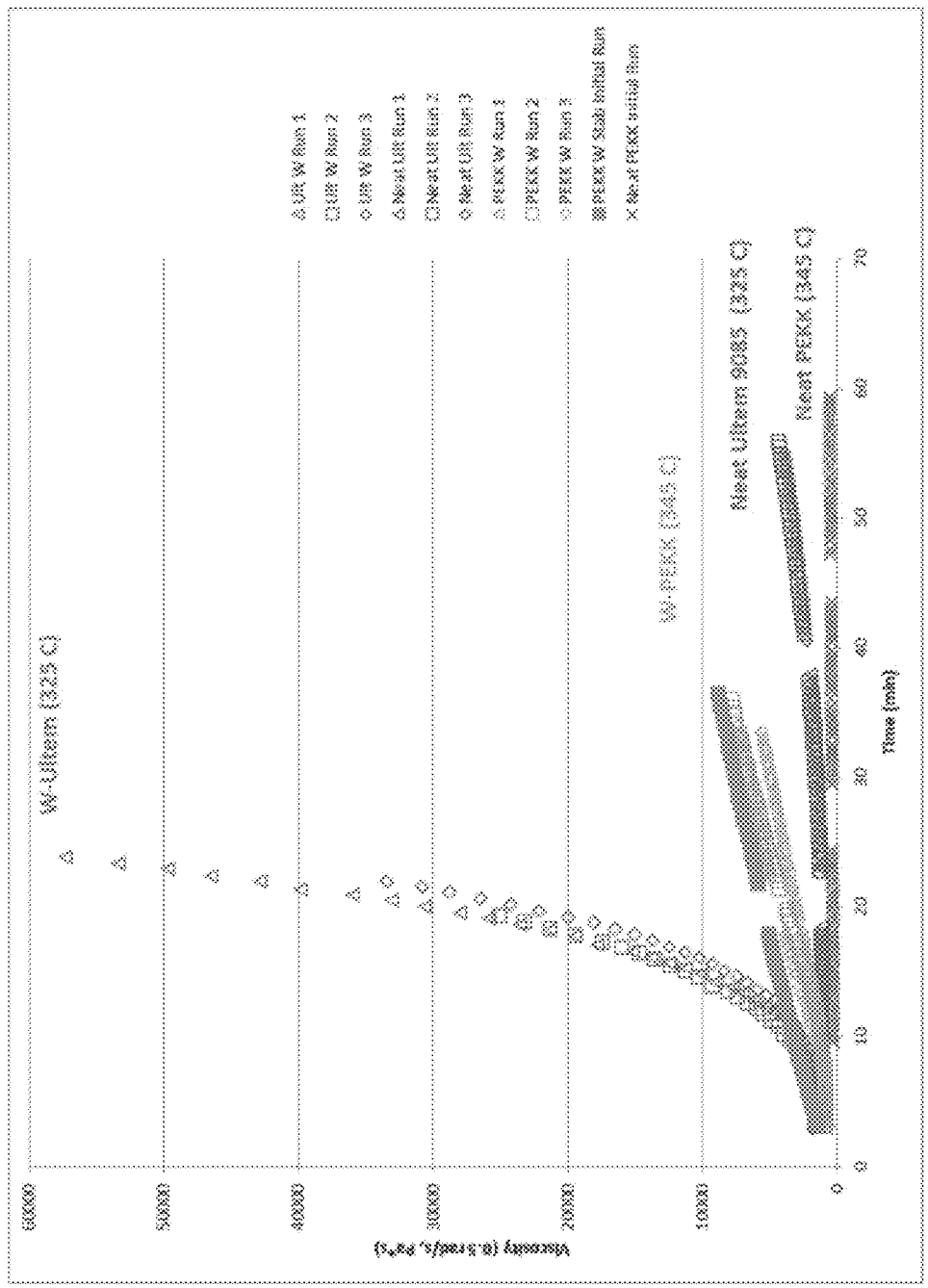
FIG. 8 is a graph of complex viscosity verses rotational speed.
Figure 9:
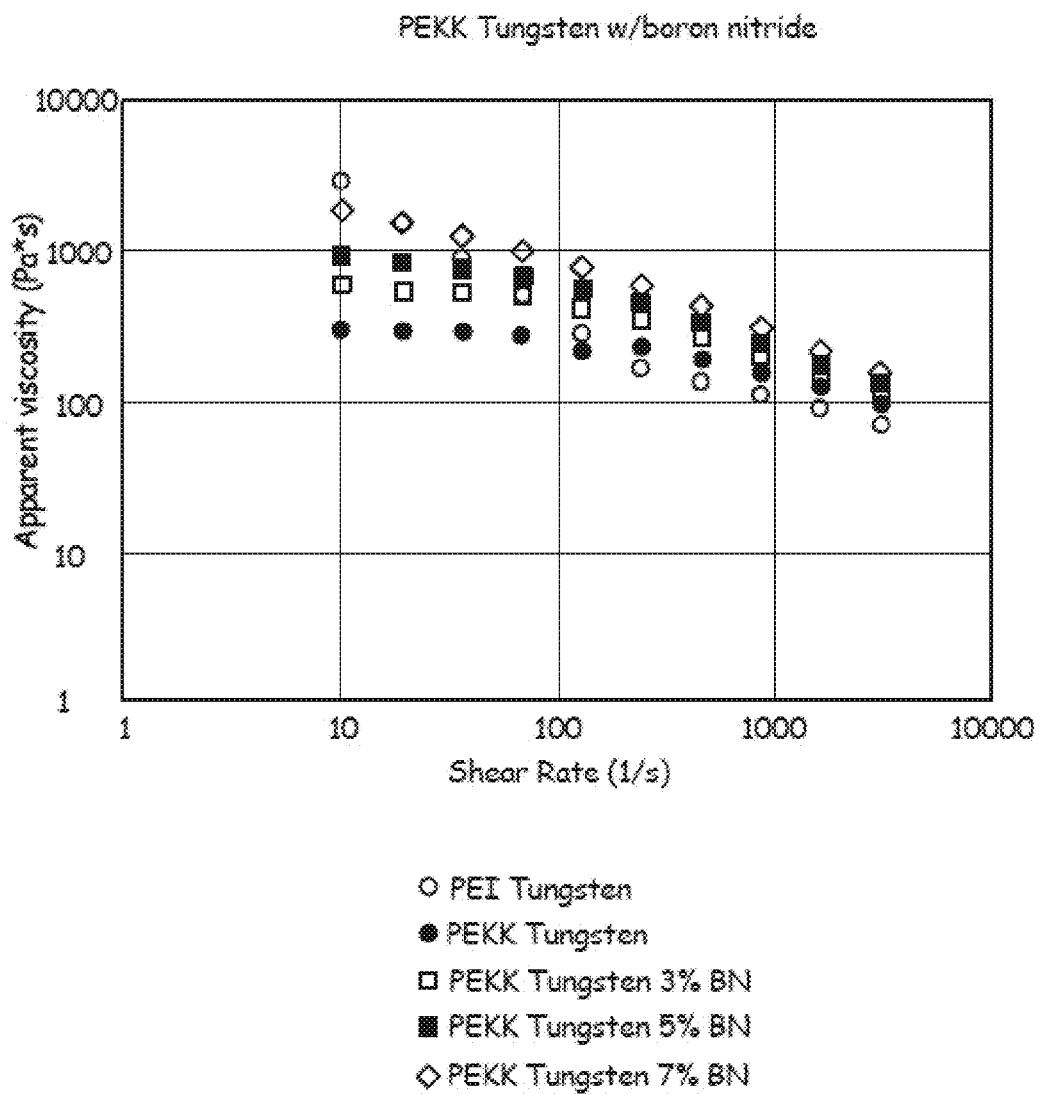
FIG. 9 is a graph of apparent viscosity verses shear rate for a PEKK polymer matrix filled with tungsten particles where boron nitride is used as a lubricant.
Figure 10:
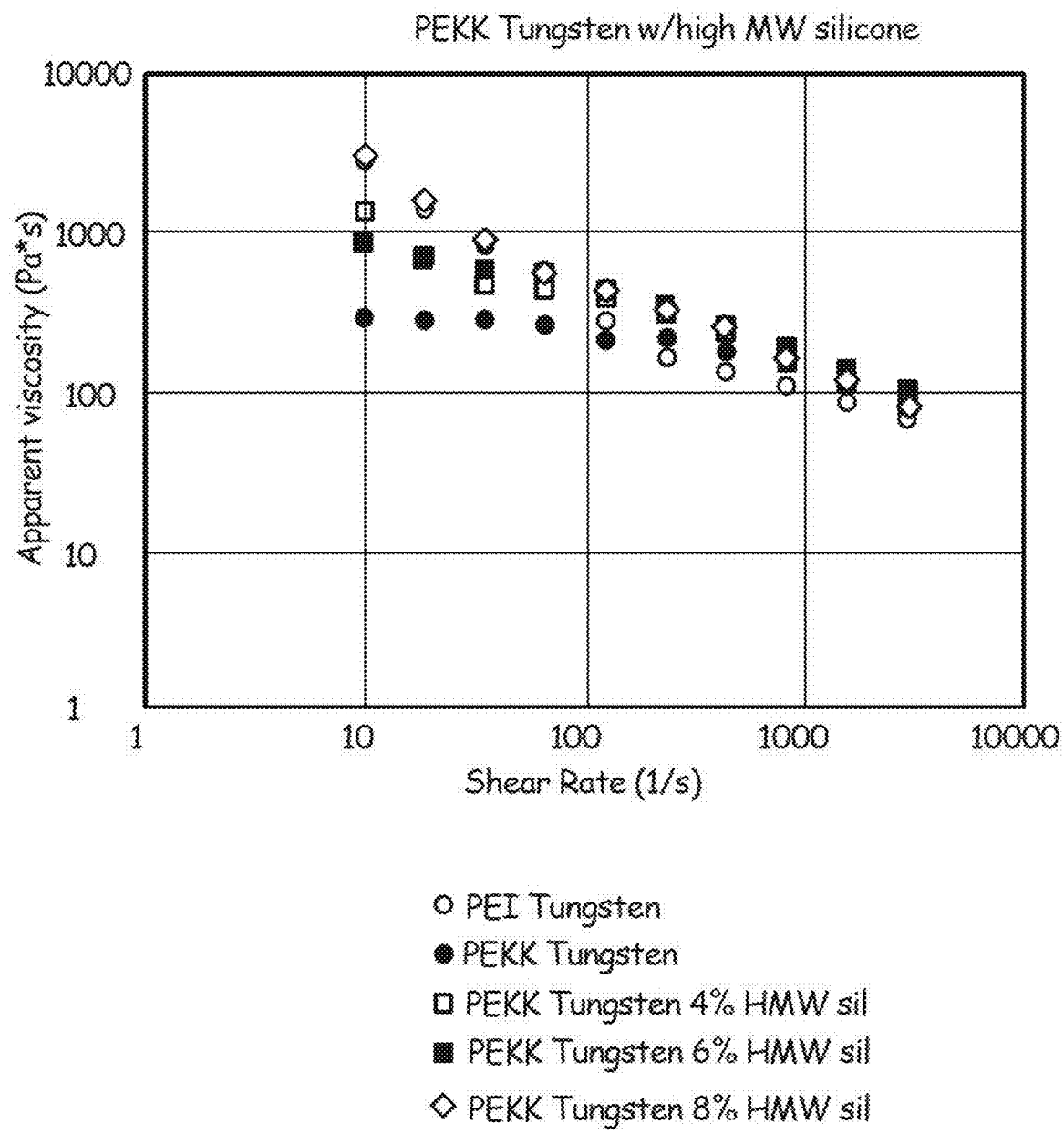
FIG. 10 is a graph of apparent viscosity verses shear rate for a PEKK polymer matrix filled with tungsten particles where silicone is used as a lubricant.
Figure 11:
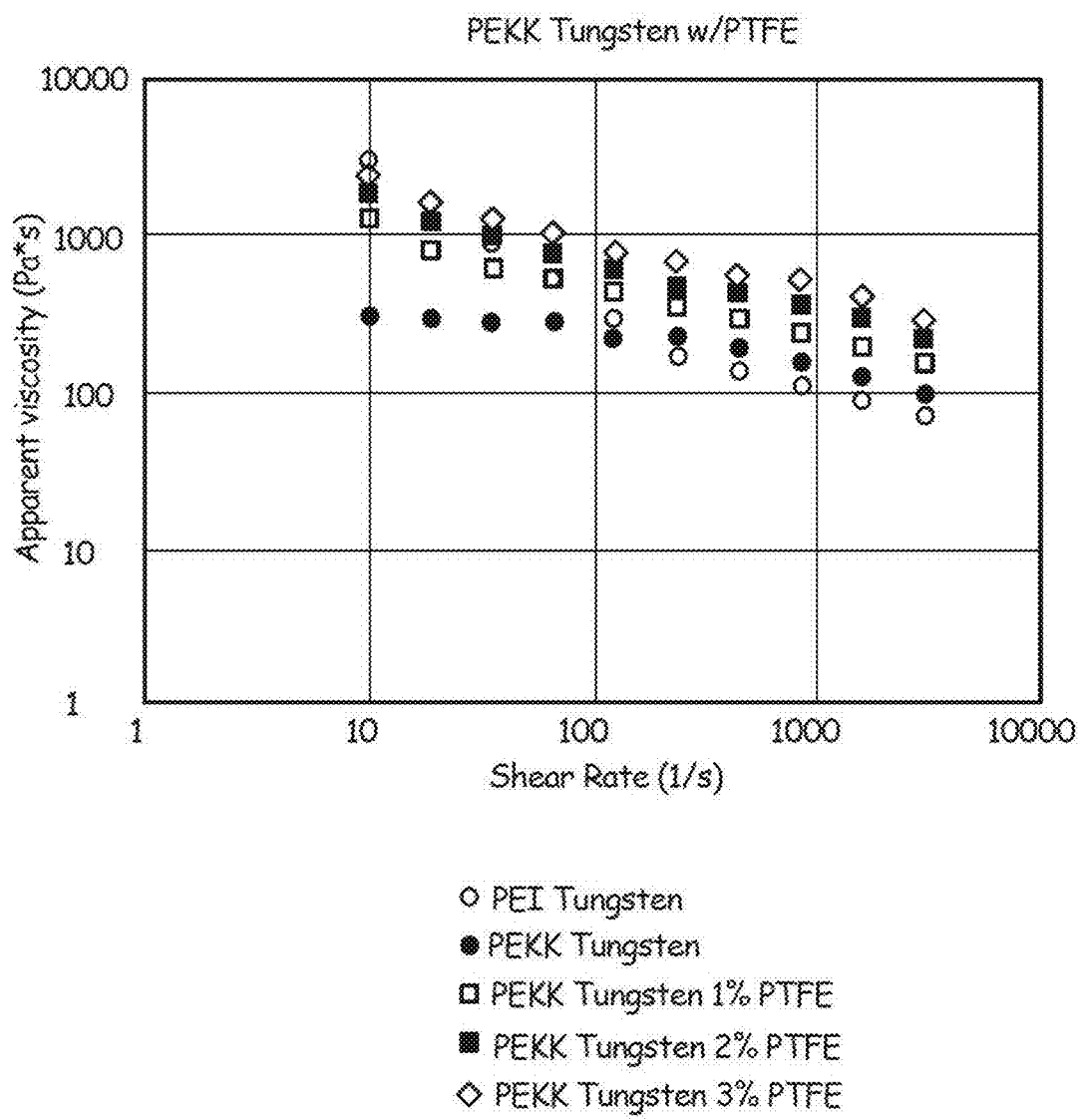
FIG. 11 is a graph of apparent viscosity verses shear rate for a PEKK polymer matrix filled with tungsten particles where PTFE is used as a lubricant.

FIG. 8 illustrates the change in complex viscosity of the PEI/tungsten and PEKK/tungsten materials over time indicating that the PEI is not the preferred polymer matrix for radiation shielding materials due to degradation and cross-linking of the PEI/tungsten formulation. The increase of the complex viscosity of the PEKK/tungsten feedstock is less than a factor of 100 when the material is subjected to a rotational speed of 5 rad/s at 1% strain for a total of 30-60 minutes. In contrast the complex viscosity of the PEI/tungsten material increase by at least of factor of 300 when the material is subjected to a rotational speed of 5 rad/s at 1% strain for a total of 30-60 minutes, which is due to degradation and crosslinking of the PEI/tungsten formulation.

Example 3

In this example, the effects of different lubricants at varying wt % on a radiation shielding material a polymer matrix PEKK filled with tungsten particles (chemical symbol W) were evaluated using capillary rheology. Testing was performed using a model LRC 7000 rheometer (Dynisco, Franklin Mass., USA) equipped with a pressure transducer to determine the apparent viscosity versus shear for each sample. Each sample was run using a 5:1 die at 345° C., with a dwell time of three minutes and at shear rates from 10 to 3,000 per second. These results were evaluated against a sample of polyetherimide filled with the same wt % of tungsten particles. Table 3 provides the formulations of the PEKK polymer matrix filled with tungsten particles and different high temperature lubricants, where all values are in weight percents, except for the column indicated as a volume percent.

TABLE 3

| Sample | PEKK wt % | W (Tungsten) (1 μ-1.5 μm), wt % | W (Tungsten) (6 μm-10 μm), wt % | W (tungsten) Vol % | Boron Nitride, wt % | Silicone, wt % | PTFE, wt % |
|---|---|---|---|---|---|---|---|
| 1 | 28.25 | 71.75 | | 14.35 | | | |
| 2 | 28.25 | 14.35 | 57.4 | 14.35 | | | |
| 3 | 26.75 | 70.25 | | 13.96 | 3.0 | | |
| 4 | 25.75 | 69.5 | | 13.70 | 5.0 | | |
| 5 | 24.5 | 68.5 | | 13.59 | 7.0 | | |
| 6 | 25.0 | 71.0 | | 13.74 | | 4.0 | |
| 7 | 23.0 | 71.0 | | 13.65 | | 6.0 | |
| 8 | 21.0 | 71.0 | | 13.57 | | 8.0 | |
| 9 | 27.75 | 71.25 | | 13.89 | | | 1.0 |
| 10 | 27.0 | 71.0 | | 13.59 | | | 2.0 |
| 11 | 26.0 | 71.0 | | 13.43 | | | 3.0 |

The PEKK material is commercially available under the KEPSTAN® 6004 trademark by Arkema, Inc. located in King of Prussia, Pa. The 1-1.5 μm tungsten particles are supplied by Inframat Advanced Materials, LLC located in Manchester, Conn. under the 74MR-0001 designation and the 6-10 μm tungsten particles were provided under the 74MR-0005 designation. The silicone utilized is sold under the Genioplast® Pellet S designation and is manufactured by Wacker Chemie AG headquartered in Munich, Germany. The boron nitride was in powder form and is sold under the PolarTherm™ PTX25 designation by Momentive Performance Materials Inc. located in Strongsville, Ohio. The PTFE was in powder form and is sold under the TF 2072 Z designation by Dyneon GmbH located in Burgkirchen an de Alz, Germany.

The results of the rheology tests that plot apparent viscosity versus shear are illustrated in FIGS. 6-8. The results of the testing indicate that the viscosity of the PEKK with tungsten formulation has an acceptable (and slightly lower, or improved) additive manufacturing extrusion value, as compared to that of the PEI filled with similar amounts of tungsten. This indicates that the PEKK formation would be suitable for printing 3D parts with radiation shielding capabilities. Also, the results indicate that the lubricants mostly act as fillers and not lubricates, indicating that the lubricants may be optional.

Example 4

Polymeric materials having dielectric particles of differing polymeric chemistries and loadings were evaluated for suitability of use in an extrusion based additive manufacturing system along with evaluating the materials dielectric constants. The polymeric chemistries that were evaluated include polyeitherimide (PEI), polyethersulfone (PES) and polyetherketoneketone (PEKK), where all samples were loaded with barium titanate particles.

Samples of PEI and PES loaded with barium titanate of the present example are in Table 4 below.

TABLE 4

| Sample | PEI (wt %) | PES (wt %) | BaTiO$_3$(wt %) | Status | dK |
|---|---|---|---|---|---|
| 1 | 80.0 | | 20.0 | Printable | 3.3 |
| 2 | 65.5 | | 34.5 | Printable | 4.1 |
| 3 | 50.0 | | 50.0 | Printable | 5.9 |
| 4 | | 80.0 | 20.0 | Printable | 4.1 |
| 5 | | 65.5 | 34.5 | Printable | 4.4 |
| 6 | | 50.0 | 50.0 | Printable | 6.4 |
| 7 | | 42.5 | 57.5 | Brittle Filament | N/A |

TABLE 4-continued

| Sample | PEI (wt %) | PES (wt %) | BaTiO$_3$(wt %) | Status | dK |
|---|---|---|---|---|---|
| 8 | | 39.0 | 61.0 | Brittle Filament | N/A |
| 9 | | 35.0 | 65.0 | N/A | N/A |
| 10 | 26.5 | | 73.5 | Brittle Filament | N/A |

Examples 1-10 referenced in Table 4 were prepared by the following protocol. Either polyeitherimide (PEI) or polyethersulfone (PES) and barium titanate (were gravity fed into a 27 mm co-rotating 40:1 L/D extruder equipped with a 5 strand die (commercially available from American Leistritz Extruder Corporation, Sommerville, N.J.). All formulations were compounded at 300 rpms using the following temperature profile: Zone 1=280° C., Zone 2-9=330° C., die=330° C. The resulting strands were allowed to cool in the air, then cut into pellets approximately ¼th inch in length. The resulting compounds were injection molded into 60×60×1 mm test plaques for dielectric permittivity/loss testing. Dielectric testing results for examples 1-6 can be found in Table 4.

The polyether imide (PEI) material is commercially available as Ultem 9085 from Sabic, Riyadh, Saudi Arabia. The polyethersulfone (PES) material is commercially available as Veradel 3600 from Solvay Specialty Polymers, Alpharetta, Ga. The PEKK material is commercially available under the KEPSTAN® 6004 trademark by Arkema, Inc. located in King of Prussia, Pa. The barium titanate powder has a particle size distribution of 0.5-3.0 µm and is supplied by Atlantic Equipment Engineers, Upper Saddle river, NJ under the BA-901 designation.

Table 5, below, includes information regarding formulations of PEKK and barium titanate and in some examples processing aids where all data is weight percents.

TABLE 5

| Sample | PEKK | $BaTiO_3$ (0.5-3.0 µm) | $BaTiO_3$ (0.3 µm) | Boron Nitride | Silicone | PTFE |
|---|---|---|---|---|---|---|
| 1 | 39 | 61 | 0 | 0 | 0 | 0 |
| 2 | 39 | 49 | 12 | 0 | 0 | 0 |
| 3 | 36 | 61 | 0 | 3 | 0 | 0 |
| 4 | 34 | 61 | 0 | 5 | 0 | 0 |
| 5 | 32 | 61 | 0 | 7 | 0 | 0 |
| 6 | 35 | 61 | 0 | 0 | 4 | 0 |
| 7 | 33 | 61 | 0 | 0 | 6 | 0 |
| 8 | 31 | 61 | 0 | 0 | 8 | 0 |
| 9 | 38 | 61 | 0 | 0 | 0 | 1 |
| 10 | 37 | 61 | 0 | 0 | 0 | 2 |
| 11 | 36 | 61 | 0 | 0 | 0 | 3 |

The PEKK material is commercially available under the KEPSTAN® 6004 trademark by Arkema, Inc. located in King of Prussia, Pa. The 0.5 µm barium titanate powder is supplied by Inframat Advanced Materials, LLC located in Manchester, Conn. under the description 5622-ON5. The 0.5-3.0 µm barium titanate powder is supplied by Atlantic Equipment Engineers, Upper Saddle river, NJ under the description BA-901. The boron nitride is supplied by Momentive Performance Materials, Inc., Strongsville, Ohio under the PTX designation. The silicone is supplied by Dow Corning Corporation, Midland, Mich. under the MB50-215 designation. The polytetrafluoroethylene (PTFE) is provided by 3M Company, Maplewood, Minn. under the PTFE TF 2017 Z designation Examples 1-11 referenced in Table 5 were prepared by the following protocol. PEKK and barium titanate were gravity fed into a 27 mm co-rotating 40:1 L/D extruder equipped with a five strand die (commercially available from American Leistritz Extruder Corporation, Sommerville, N.J.). The PEKK was fed in the throat while the barium titanate was side stuffed in zone 4. All formulations were compounded at 300 rpms using the following temperature profile: Zone 1=280° C., Zone 2-9=330° C., die=330° C. The resulting strands were allowed to cool in the air, then cut into pellets approximately ¼th inch in length.

Filament was created from example #1 by placing the PEKK/$BaTiO_3$ compounds into a 1.25" single screw 2.5:1 L/d extruder (DS H12 Davis Standard, Pawcatuck, Conn.) operating at 23 rpm. The temperature profile during extrusion was as follows: Zone 1-3: 320° C. 330° C., 350° C., zone 4: 335° C., Die: 370° C. The composition was extruded through a monofilament die, pulled through an air ring, then around an airframe to cool. The resulting filament was fed through a laser micrometer linked to a pulling system used to size the filament to a specific diameter. This filament was then wound onto a spool for use in various FDM systems.

Parts were printed utilizing a Fortus 450mc system commercially available from Stratasys, Inc. located in Eden Prairie, Minn. Filaments consisting of the example #1 listed in Table 5 were melted in a heated tube liquefier of the Fortus system at a set temperature range of 400° C. to 415° C. The resulting molten material was then deposited in a heated build envelope maintained at a temperature of 130-140° C. Specimens were printed in a layer by layer manner for physical property testing.

Plaques of the dimensions 4"×4"×0.125" were printed for dielectric permittivity/loss testing in the frequency range of 11 Hz to 2 MHz by Intertek. Test specimens in the dimensions of 0.4"×0.7"×0.9" were printed for permittivity/loss testing in the GHz frequency range by Element. One test had no air gap between the plaques. Second test had a 0.002 inch air gap between the plaques. A third test had a 0.004 inch air gap between the plaques. The dielectric constant and dissipation factor were determined pursuant to ASTM D150 for the 4" plaques and ASTM D2520-13 for the 0.4"×0.7"×0.9" cubes at 73° F. and a relative humidity of 23%. The results of the testing are found in Table 6, below.

TABLE 6

| | R to R air gap = 0.0" | | R to R air gap = 0.002" | | R to R air gap = 0.004" | |
|---|---|---|---|---|---|---|
| Frequency | Permittivity rating | Dissipation factor | Permittivity rating | Dissipation factor | Permittivity rating | Dissipation factor |
| 10 Hz | 7.05 | 0.003 | 6.43 | 0.003 | 5.65 | 0.003 |
| 1 kHz | 7.03 | 0.003 | 6.42 | 0.003 | 5.64 | 0.003 |
| 10 kHz | 7.02 | 0.003 | 6.37 | 0.003 | 5.62 | 0.003 |
| 100 kHz | 5.91 | 0.007 | 5.31 | 0.008 | 4.59 | 0.009 |
| 1 MHz | 6.91 | 0.034 | 6.22 | 0.005 | 5.57 | 0.008 |
| 9.375 GHz | 7.67 | 0.012 | 6.73 | 0.014 | 6.21 | 0.015 |

Table 7 shows physical properties for different print orientations of formulation 1 from Table 5.

TABLE 7

| Sample description | Tensile Peak Stress (lbf/in$^2$) | | Tensile Strain at Break (%) | | Flex Modulus (lbf/in$^2$) | | Un-notched Izod Impact (ft*lb/in) | |
|---|---|---|---|---|---|---|---|---|
| | Ave | S.D. | Ave | S.D. | Ave | S.D. | Ave | S.D. |
| PEEK/BaTiO$_3$ (XZ) | 7080 | 335 | 1.02 | 0.06 | 722000 | 22100 | 1.61 | 0.44 |
| PEEK/BaTiO$_3$ (ZX) | 2580 | 413 | 0.48 | 0.1 | 411000 | 13900 | Not tested | Not tested |

The tensile peak stress and tensile strain at break were determined pursuant to ASTM D638. The flexural modulus was determined pursuant to ASTM D790. The un-notched Izod impact was determined pursuant to ASTM D256.

Although the present disclosure has been described with reference to preferred embodiments, workers skilled in the art will recognize that changes may be made in form and detail without departing from the spirit and scope of the disclosure.

The invention claimed is:

1. A method of printing a radiation shielding part with an additive manufacturing system, the method comprising:
identifying first regions of the part that require gamma radiation absorption;
identifying second regions of the part that require re-direction of radio frequency radiation;
providing a first melt-processable material configured as a first filament feedstock, the first melt processable material comprising:
a first polymeric matrix comprising one or more polyaryletherketones, wherein the first polymeric matrix comprises between about 10 wt % and about 50 wt % of the total weight of the first filament feedstock; and
radiation absorbing particles dispersed within the first polymeric matrix wherein the radiation absorption particles comprise particles of tungsten, silver, tantalum, molybdenum, bismuth, iron, steel, stainless steel, copper, brass, bronze, zinc, aluminum, beryllium, manganese, barium sulfate, arsenic powder and combinations thereof and comprise between about 50 wt % and less than 90 wt % of the total weight of the first filament feedstock, wherein the radiation shielding particles have a maximum size of 25 μm;
providing a second melt-processable material configured as a second filament feedstock, the second melt-processable material comprising:
a second polymeric matrix comprising one or more polyaryletherketones, wherein the second polymeric matrix comprises between about 10 wt % and about 50 wt % of the total weight of the second filament feedstock; and
the radiation redirecting particles dispersed within the second polymeric matrix wherein the radiation redirection particles comprise particles of barium titanate, various conjugated polymers, lead ziconate titanate, calcium copper titanate, barium strontium titanate, strontium titanate or other inorganic fillers having a cubic perovskite structures or combinations thereof and comprise between about 50 wt % and less than 90 wt % of the total weight of the second filament feedstock, wherein the radiation shielding particles have a maximum size of 25 μm;
heating the first filament feedstock to a melted state in a first print head; and
depositing the melted first filament feedstock from a nozzle of the first print head along toolpaths in a build pattern based upon a digital model of the part to print the first regions of the radiation shielding part, wherein the first regions of the radiation shielding part absorbs gamma radiation, wherein the nozzle of the first print head has an inner diameter ranging from about 125 microns to about 510 microns;
heating the second filament feedstock to a melted state in a second print head; and
depositing the melted second filament feedstock from a nozzle of the second print head along toolpaths in a build pattern based upon a digital model of the part to print the second regions of the radiation shielding part, wherein the second regions of the radiation shielding part redirects gamma radiation, wherein the nozzle of the second print head has an inner diameter ranging from about 125 microns to about 510 microns; and
wherein the radiation shielding part resists off gassing in a vacuum and provides gamma radiation absorption and a dielectric effect that redirects a path of the radio-frequency radiation.

2. The method of claim 1, and further comprising:
identifying third regions of the part that do not require radiation shielding;
providing a third melt-processable material as a third filament feedstock, wherein the third melt-processable feedstock does not contain radiation shielding materials;
heating the third filament feedstock to a melted state; and
depositing the melted third filament feedstock along toolpaths in the identified regions of the part that do not require radiation shielding.

3. The method of claim 1, wherein the first polymeric matrix and the second polymeric matrix of the first and second melt-processable materials is polyetherketoneketone (PEKK).

4. The method of claim 1, wherein the radiation shielding particles comprise between about 70 wt % and about 85 wt % of the total weight of the first melt-processable material.

5. The method of claim 4, wherein the radiation absorbing particles are particles of tungsten and the polymeric matrix comprises PEKK.

6. The method of claim 1, wherein the radiation redirecting particles comprise between about 50 wt % and less than 75 wt % of the total weight of the second melt-processible material.

7. The method of claim 6, wherein the second regions of the part comprise density gradients and periodic surfaces configured to act as an insulator from radiation or to alter the path of the radio-frequency radiation.

8. The method of claim 6, wherein the second regions of the part comprise spatially variant features configured to provide a metamaterial cloak.

9. The method of claim 6, wherein the second melt-processable material has a relative permittivity of between about 6 and about 10.

10. The method of claim 6, and wherein the second melt-processable material has a relative permittivity of between about 8 and about 10.

11. The method of claim 6, wherein the wherein the radiation redirecting particles comprise between about 55 wt % and less than 65 wt % of the total weight of the second melt-processable material.

12. The method of claim 11, wherein the radiation redirecting particles comprise barium titanate and the polymeric matrix comprises PEKK.

13. A method of printing a radiation shielding part with an additive manufacturing system, the method comprising:
identifying first regions of the part that require gamma radiation absorption;
identifying second regions of the part that require redirection of radio frequency radiation;
identifying third regions of the part that require neither gamma radiation absorption or redirection of radio frequency radiation;
providing a first melt-processable material configured as a first filament feedstock, the first melt-processable material comprising:
a first polymeric matrix comprising one or more polyaryletherketones, wherein the first polymeric matrix comprises between about 10 wt % and about 50 wt % of the total weight of the first feedstock; and
radiation absorbing particles dispersed within the polymer matrix, the radiation absorbing particles comprise particles of tungsten, silver, tantalum, molybdenum, bismuth, iron, steel, stainless steel, copper, brass, bronze, zinc, aluminum, beryllium, manganese, barium sulfate, arsenic powder and combinations thereof and comprise between about 50 wt % and less than 90 wt % of the total weight of the first filament feedstock, wherein the radiation shielding particles have a maximum size of 25 μm;
providing a second melt-processable material configured as a second filament feedstock, the second melt-processable material comprising:
a second polymeric matrix comprising one or more polyaryletherketones, wherein the second polymeric matrix comprises between about 10 wt % and about 50 wt % of the total weight of the second feedstock; and
the radiation redirecting particles dispersed within the polymer matrix, the radiation redirecting particles comprise particles of barium titanate, various conjugated polymers, lead ziconate titanate, calcium copper titanate, barium strontium titanate, strontium titanate or other inorganic fillers having a cubic perovskite structures or combinations thereof and comprise between about 50 wt % and less than 90 wt % of the total weight of the second filament feedstock, wherein the radiation shielding particles have a maximum size of 25 μm;
providing a third melt-processable material configured as a third filament feed stock, the third melt processable material comprising a third polymeric matrix comprising one or more polyaryletherketones;
heating each of the first filament feedstock, the second filament feedstock and the third filament feedstock to a melted state; and
depositing the melted first filament feedstock, the melted second filament feedstock and third melted filament feedstock through a first nozzle of a first print head, a second nozzle of a second print head and a third nozzle of a print head along toolpaths in a build pattern based upon a digital model of the part to print the 3D part, wherein the first nozzle of the first print head and the second nozzle of the second print head have an inner diameter ranging from about 125 microns to about 510 microns; and
wherein the radiation shielding part resists off gassing in a vacuum and provides gamma radiation absorption and a dielectric effect that redirects a path of the radio-frequency radiation.

14. The method of claim 13, wherein regions of the part printed with the second filament feedstock comprise density gradients and periodic surfaces configured to act as an insulator from radiation or to alter the path of the radio-frequency radiation.

15. The method of claim 13, wherein regions of the part printed with the second filament feedstock comprise spatially variant features configured to provide a metamaterial cloak.

16. The method of claim 13, wherein the radiation shielding particles comprise between about 70 wt % and about 85 wt % of the total weight of the first melt-processable material.

17. The method of claim 16, wherein the radiation absorbing particles are particles of tungsten and the first polymeric matrix comprises PEKK.

18. The method of claim 13, wherein the wherein the radiation redirecting particles comprise between about 55 wt % and less than 65 wt % of the total weight of the second melt-processable material.

19. The method of claim 18, wherein the radiation redirecting particles comprise barium titanate and the second polymeric matrix comprises PEKK.

* * * * *